(12) United States Patent
Chen

(10) Patent No.: US 12,493,648 B2
(45) Date of Patent: Dec. 9, 2025

(54) METHOD AND APPARATUS FOR RECOMMENDING COLD START OBJECT, COMPUTER DEVICE, AND STORAGE MEDIUM

(71) Applicant: Tencent Technology (Shenzhen) Company Limited, Shenzhen (CN)

(72) Inventor: Hao Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 18/378,570

(22) Filed: Oct. 10, 2023

(65) Prior Publication Data

US 2024/0037133 A1    Feb. 1, 2024

Related U.S. Application Data

(63) Continuation of application No. PCT/CN2023/077189, filed on Feb. 20, 2023.

(30) Foreign Application Priority Data

Mar. 30, 2022  (CN) .......... 202210326097.X

(51) Int. Cl.
  *G06F 16/435*  (2019.01)
  *G06F 16/25*  (2019.01)

(52) U.S. Cl.
  CPC .......... *G06F 16/435* (2019.01); *G06F 16/258* (2019.01)

(58) Field of Classification Search
  CPC .............. G06F 16/435; G06F 16/258
  See application file for complete search history.

(56) References Cited

U.S. PATENT DOCUMENTS

| | | | |
|---|---|---|---|
| 2016/0188734 A1* | 6/2016 | Morley | G06F 16/9535 707/734 |
| 2019/0251446 A1 | 8/2019 | Fang et al. | |
| 2019/0362233 A1* | 11/2019 | Aizawa | G06V 10/82 |
| 2020/0184376 A1* | 6/2020 | Parameswaran | G06N 20/00 |
| 2021/0056251 A1* | 2/2021 | Parmar | G06F 3/04847 |
| 2021/0398193 A1* | 12/2021 | Cetintas | G06F 16/2264 |

FOREIGN PATENT DOCUMENTS

| | | | | |
|---|---|---|---|---|
| CN | 112102015 A | * | 12/2020 | ............. G06N 20/00 |
| CN | 114077662 A | | 2/2022 | |

OTHER PUBLICATIONS

Tencent Technology, ISR, PCT/CN2023/077189, May 23, 2023, 2 pgs.

* cited by examiner

*Primary Examiner* — Tony Wu
(74) *Attorney, Agent, or Firm* — Morgan, Lewis & Bockius LLP

(57) ABSTRACT

This application relates to a method for recommending a cold start object performed by a computer device. The method includes: obtaining a content feature and an initial preference feature that are of a target object in a cold start state; performing multilayer perceptron processing on the content feature based on a meta-mapping network to obtain a feature mapping relationship matching the target object; performing a mapping transformation on the initial preference feature according to the feature mapping relationship, to obtain an updated preference feature close to a target preference feature spatial distribution; and performing recommendation analysis on the target object based on the updated preference feature, to obtain a recommendation result for the target object.

14 Claims, 7 Drawing Sheets

METHOD AND APPARATUS FOR RECOMMENDING COLD START OBJECT, COMPUTER DEVICE, AND STORAGE MEDIUM

CROSS-REFERENCE TO RELATED APPLICATIONS

This application is a continuation application of PCT Patent Application No. PCT/CN2023/077189, entitled "METHOD AND APPARATUS FOR RECOMMENDING COLD START OBJECT, COMPUTER DEVICE, AND STORAGE MEDIUM" filed on Feb. 20, 2023, which claims priority to Chinese Patent Application No. 202210326097.X, entitled "METHOD AND APPARATUS FOR RECOMMENDING COLD START OBJECT, COMPUTER DEVICE, AND STORAGE MEDIUM" filed with the China National Intellectual Property Administration on Mar. 30, 2022, all of which is incorporated by reference in its entirety.

FIELD OF THE TECHNOLOGY

This application relates to the field of computer technologies, and in particular, to a method and an apparatus for recommending a cold start object, a computer device, a storage medium, and a computer program product.

BACKGROUND OF THE DISCLOSURE

With the development of computer technologies, more and more man-machine interaction scenarios appear. For example, for objects such as short videos, images, or articles with which users interact on a daily basis, generally the users need to make active searches to find objects that the users prefer. For massive interactive objects provided by a system, an operation process of an active search is complex and requires a large amount of data processing resources. To solve this problem, objects that users prefer are actively recommended to the users, so that interaction effectiveness can be greatly improved, and daily life and entertainment of the users can be greatly facilitated.

However, in a conventional object recommendation method, generally, during recommendation for users, a preference user of an object is determined based on interaction data between users and the object, and then the object is recommended to the preference user. However, this object recommendation method relies on the interaction data between the users and the object. For an object in a cold start state, because there is no interaction data or there is a small amount of interaction data, accurate recommendation of the object cannot be implemented.

SUMMARY

According to embodiments of this application, a method and an apparatus for recommending a cold start object, a computer device, a computer-readable storage medium, and a computer program product are provided.

According to a first aspect, this application provides a method for recommending a cold start object, performed by a computer device. The method includes:
  obtaining a content feature and an initial preference feature that are of a target object in a cold start state;
  performing multilayer perceptron processing on the content feature based on a meta-mapping network to obtain a feature mapping relationship matching the target object;
  performing a mapping transformation on the initial preference feature according to the feature mapping relationship, to obtain an updated preference feature close to a target preference feature spatial distribution; and
  performing recommendation analysis on the target object based on the updated preference feature, to obtain a recommendation result for the target object.

According to a third aspect, this application provides a computer device. The computer device includes a memory and one or more processors, the memory storing computer-readable instructions that, when executed by the one or more processors, cause the computer device to perform the aforementioned method for recommending a cold start object.

According to a fourth aspect, this application provides a non-transitory computer-readable storage medium. The computer-readable storage medium stores computer-readable instructions that, when executed by the one or more processors, cause the computer device to perform the aforementioned method for recommending a cold start object.

Details of one or more embodiments of this application are provided in accompany drawings and descriptions below. Other features, objectives, and advantages of this application will become apparent from the specification, the accompanying drawings, and the claims.

DESCRIPTION OF EMBODIMENTS

To make the objectives, technical solutions, and advantages of this application clearer and more understandable, this application is further described in detail below with reference to the accompanying drawings and embodiments. It is to be understood that the specific embodiments described herein are only used for explaining this application, and are not used for limiting this application.

The solutions provided in the embodiments of this application may relate to technologies such as artificial intelligence (AI) and machine learning (ML). In this application, based on the technologies such as the artificial intelligence and the machine learning, a content feature and an initial preference feature that are of a target object in a cold start state are obtained, multilayer perceptron processing is performed on the content feature based on a meta-mapping network obtained through training based on interaction data of a recommendation object in a simulated cold start state, and a feature mapping relationship matching the target object is determined; and a mapping transformation is performed on the initial preference feature according to the feature mapping relationship and an updated preference feature close to a target preference feature spatial distribution is obtained. In this way, a spatial distribution of the updated preference feature is close to a spatial distribution of a preference feature corresponding to the recommendation object, recommendation analysis is performed on the target object based on the updated preference feature, and an accurate recommendation result is obtained.

Figure 1:
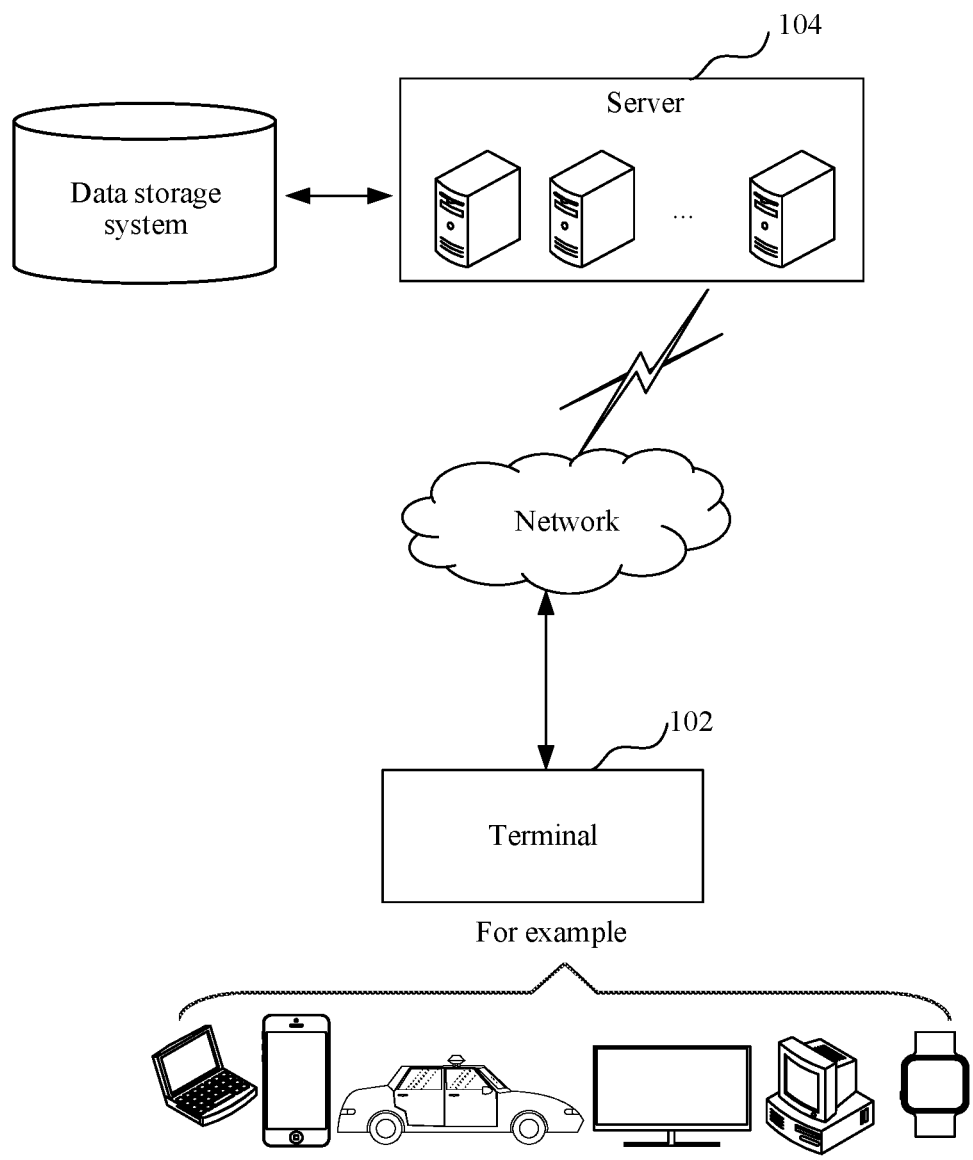
FIG. 1 is a diagram of an application environment of a method for recommending a cold start object according to an embodiment.

A method for recommending a cold start object provided in an embodiment of this application may be applied to an application environment shown in FIG. 1. A terminal 102 communicates with a server 104 through a network. A data storage system may store data that the server 104 needs to process. The data storage system may be integrated on the server 104, or may be placed on a cloud or another server. The server 104 obtains a content feature and an initial preference feature that are of a target object in a cold start state; performs multilayer perceptron processing on the content feature based on a meta-mapping network obtained through training based on interaction data of a recommendation object in a simulated cold start state, and determines a feature mapping relationship matching the target object; and performs a mapping transformation on the initial preference feature according to the feature mapping relationship, to obtain an updated preference feature close to a target preference feature spatial distribution. The server 104 performs recommendation analysis on the target object based on the updated preference feature, to obtain a recommendation result for the target object, and recommends, when the recommendation result satisfies a recommendation condition, the target object to the terminal 102 that is indicated by the recommendation result and on which a user is located for display. The terminal 102 may be, but is not limited to, a desktop computer, a notebook computer, a smartphone, a tablet computer, an internet of things device, or a portable wearable device. The internet of things device may be a smart speaker, a smart television, a smart air conditioner, a smart in-vehicle device, or the like. The portable wearable device may be a smart watch, a smart band, a head-mounted device, or the like. The server 104 may be implemented by using an independent server or a server cluster that includes a plurality of servers.

Figure 2:
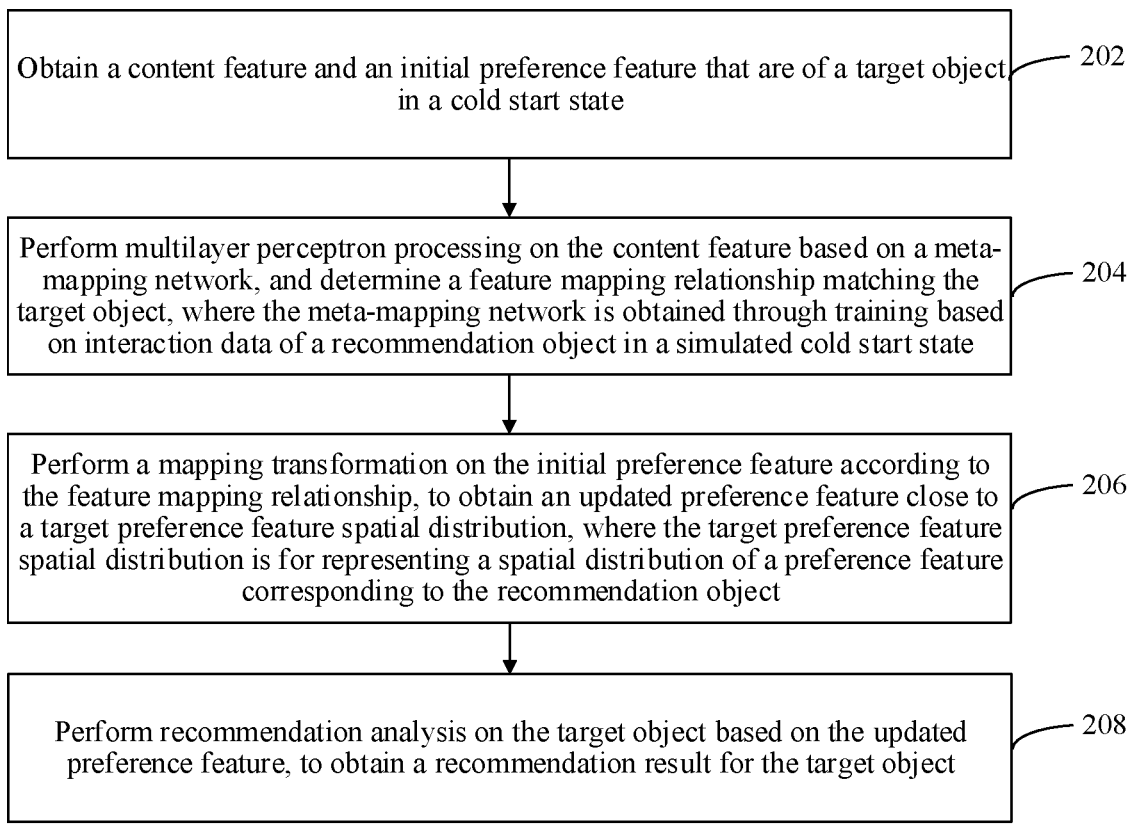
FIG. 2 is a schematic flowchart of a method for recommending a cold start object according to an embodiment.

In an embodiment, as shown in FIG. 2, a method for recommending a cold start object is provided. This embodiment of this application may be applied to an application for information recommendation and display, which can predict content that a user may be interested in and make a precise recommendation. A recommendation scenario may be a text recommendation scenario, a video recommendation scenario, a music recommendation scenario, or the like. The video recommendation scenario may include a recommendation of content such as TV shows or movies with long duration, or may include a recommendation of various short videos such as videos with short duration, for example, duration less than 5 minutes, on a short video platform.

In this embodiment of this application, the method for recommending a cold start object provided in this application is described in detail by using a short video recommendation scenario as an example. The scenario is only an example, and does not limit the protection scope of the technical solutions of this application. A description is made by using an example in which the method is applied to a computer device in FIG. 1, and includes the following steps:

Step 202: Obtain a content feature and an initial preference feature that are of a target object in a cold start state.

The target object is a recommended object including, but not limited to, a product object, an audio and video object, an electronic reading object, or the like that is presented on a terminal device and may implement interaction with a receiving object. The receiving object is an object that actually exists and includes, but is not limited to, a user and/or a device such as a client that is used by the user. A specific form of interaction generated by interaction between the receiving object and the recommended object may vary with scenarios, and includes, but is not limited to, liking, forwarding, browsing, ordering, adding to favorites, sharing, commenting, or the like. Specifically, the receiving object may interact with different target objects in different scenarios. For example, in a multimedia scenario, the target object may be a multimedia file such as music, a short video, or an article that is liked, added to favorites, or forwarded. In an e-commerce scenario, the target object may be an item added to a shopping cart or an item that has been purchased. In an advertising scenario, the target object may be an ad that has been clicked or added to favorites.

Cold start is a case in which data prediction and analysis are performed on an object when an amount of reference data for the object is less than or equal to a set threshold. The set threshold may be a very small value compared with an amount of reference data for an object on which data prediction and analysis have been successfully performed. For example, the set threshold may be zero or a value that is much less than a value of the amount of reference data for the object on which data prediction and analysis have been successfully performed. Specifically, the cold start may be a case in which there is no reference historical data or only a very small amount of reference data for the object. For example, in a recommendation system, a quantity of recommended objects keeps increasing. For a newly added recommended object in the recommendation system, as a newly added member, due to a lack of interaction data with a receiving object, a process for the newly added recommended object to enter the recommendation system for recommendation lacks reference interaction data. This process is a cold start process, and a state of the newly added recommended object in the cold start process is a cold start state.

In some embodiments, a short video recommendation system is used as an example, a short video newly uploaded by a creator is the target object in the cold start state. Because there is currently no interaction record such as playing completion, liking, and sharing of the short video by other users, it is difficult for the recommendation system to identify a preference audience of the short video, a target recommendation group tends to be inaccurate, and a recommendation conversion rate is affected. This is a cold start problem of the short video.

Figure 3:
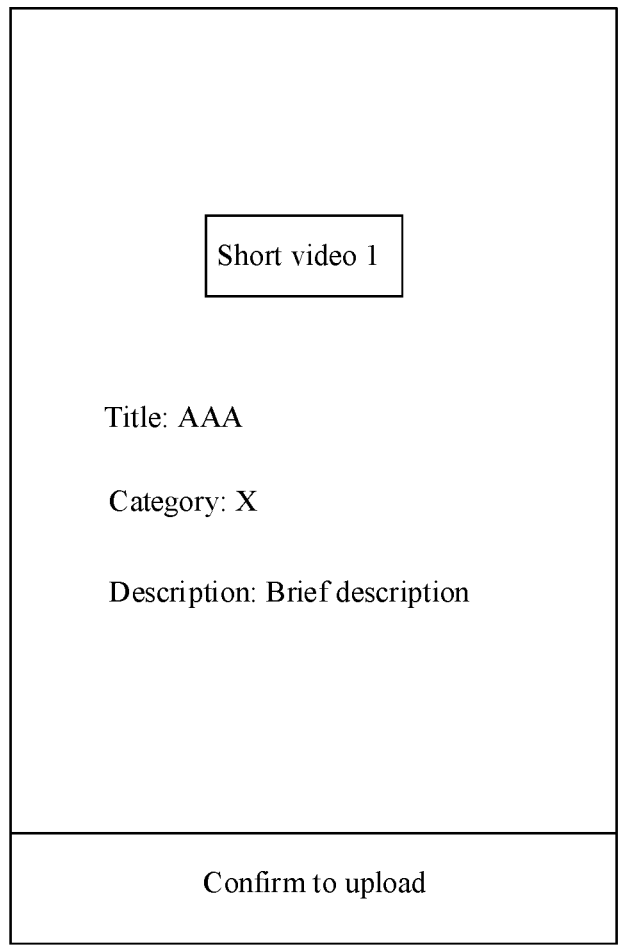
FIG. 3 is a schematic diagram of a target object in a cold start state according to an embodiment.

The content feature is a feature extracted from content data matching the target object, and the content data may include related description for the target object. As shown in FIG. 3, the content data may include content-related available information such as a title, a category, and description that are written by a user in a case of uploading the target object, and information obtained by performing content extraction on the target object.

A preference feature is for representing a preference of the target object for the receiving object with which the target object interacts, and the initial preference feature is a preference feature given by the target object in the cold start state. Specifically, the initial preference feature may be a preference feature that is randomly generated by the recommendation system, or may be a preference feature that is generated based on feature distribution features of all existing recommendation objects with sufficient interaction data and sufficient learning.

Specifically, in response to an event of newly adding a target object, the computer device searches for interaction data corresponding to the target object, determines a current state of the target object based on a data amount of the interaction data, and determines, when the data amount of the interaction data is zero or is less than a set data amount threshold, that a state of the newly added target object is the cold start state. The computer device extracts the content feature of the target object based on the content data included in the target object, and determines the initial preference feature of the target object based on object identification information of the target object.

Step 204: Perform multilayer perceptron processing on the content feature based on a meta-mapping network, and determine a feature mapping relationship matching the target object, where the meta-mapping network is obtained through training based on interaction data of a recommendation object in a simulated cold start state.

The meta-mapping network is a network model obtained through training based on the interaction data of the recommendation object in the simulated cold start state. The recommendation object may be a recommendation object whose data amount of existing interaction data reaches an amount threshold and whose recommendation success rate reaches a probability threshold in the recommendation system. That the data amount reaches the amount threshold represents that the recommendation object has sufficient interaction data. That the recommendation success rate reaches the probability threshold represents that preference data for the recommendation object is sufficiently learned in the recommendation system, so that accurate recommendation can be implemented.

The simulated cold start state is a cold start state that is simulated for the recommendation object in a non-cold start state through selection of interaction data. A preference feature distribution in the cold start state and spatial distribution features of preference features of the recommendation object in the non-cold start state can be fully learned by simulating the cold start state of the recommendation object, and a network parameter in an initial meta-mapping network is trained, so that the meta-mapping network obtained through training can generate the feature mapping relationship in a one-to-one correspondence with the target object, thereby transforming, through the feature mapping relationship, the initial preference feature of the target object into an updated preference feature close to a spatial distribution of a preference feature corresponding to the recommendation object.

Figure 4:
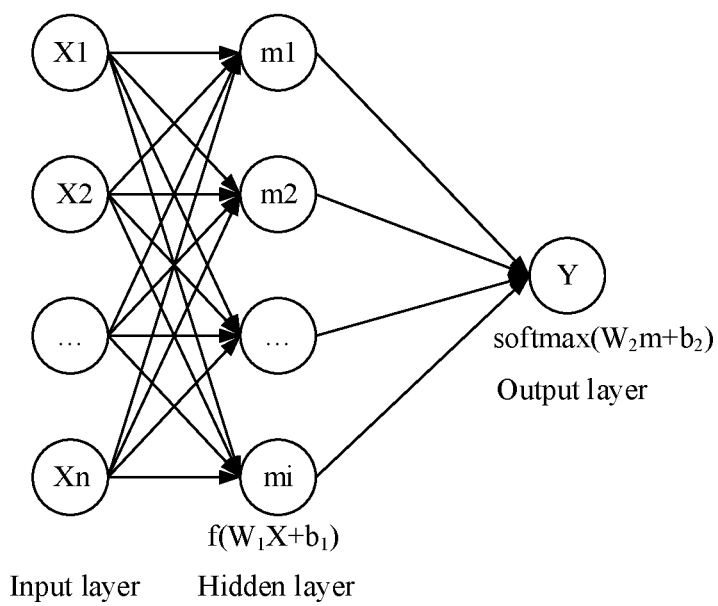
FIG. 4 is a schematic structural diagram of a multilayer perceptron processing machine according to an embodiment.

The multilayer perceptron processing is a process of mapping multi-dimension-based data on single piece of data. Specifically, mapping processing of multilayer perception may be implemented through a multilayer perceptron (also referred to as an artificial neural network model). As shown in FIG. 4, in addition to an input/output layer, the multilayer perceptron includes a plurality of hidden layers in the middle, and layers in the multilayer perceptron are fully connected. To be specific, a bottom layer of the multilayer perceptron is an input layer, the hidden layer is in the middle, and the last is an output layer. A neuron of the hidden layer is fully connected to the input layer. Assuming that the input layer is represented by a vector X, an output of the hidden layer is $f(W_1X+b_1)$, where $W_1$ is a connection coefficient between the input layer and the hidden layer, $b_1$ is an offset from the input layer to the hidden layer, and a function f may be a common sigmoid function or tanh function. The hidden layer to the output layer is a multinomial logistic regression, namely, a softmax regression. An output of the output layer is $softmax(W_2X_1+b_2)$, where $X_1$ represents the output $f(W_1X+b_1)$ of the hidden layer, $W_2$ is a connection coefficient between the hidden layer and the output layer, and $b_2$ is an offset from the hidden layer to the output layer.

The multilayer perceptron processing is actually a processing process of using the content feature as input data of the multilayer perceptron and performing logic analysis based on a trained parameter included in each layer in the multilayer perceptron, and an output result obtained through the multilayer perceptron processing is the feature mapping relationship matching the target object. The parameter of each layer in the multilayer perceptron includes a connection coefficient and an offset, including $W_1$, $b_1$, $W_2$, $b_2$, and the like that are between each layer. Determining of the parameter of each layer in the multilayer perceptron may be obtained through model training. A specific training process of the model training includes: first randomly initializing all parameters of the multilayer perceptron, then performing iterative training, and continuously calculating a gradient and updating the parameters until a training stop condition is satisfied, where the training stop condition may be at least one of conditions that accuracy satisfies an accuracy requirement, an error satisfies an error requirement, or a quantity of iterations satisfies a quantity requirement.

The feature mapping relationship is a data processing rule that needs to be followed during a mapping transformation of the initial preference feature. The feature mapping relationship may specifically include at least one of processing logic such as feature space stretching and feature space offset. Specifically, the feature mapping relationship may be for performing feature space stretching on the initial preference feature to fuse the content feature, or may be for performing feature space offset on the initial preference feature to filter out a noise feature, or may be for first performing feature space stretching on the initial preference feature to fuse the content feature and then performing feature space offset on the initial preference feature to filter out a noise feature. Details may be set as required according to an actual scenario.

Specifically, after obtaining the content feature of the target object, the computer device performs the multilayer perceptron processing on the content feature of the target object based on the meta-mapping network obtained through training based on the interaction data of the recommendation object in the simulated cold start state, and obtains the feature mapping relationship matching the target object. When there are a plurality of target objects, the computer device may use a plurality of processes to simultaneously perform the multilayer perceptron processing on the target objects based on the meta-mapping network obtained through training, and obtain a feature mapping relationship matching each target object.

Step 206: Perform a mapping transformation on the initial preference feature according to the feature mapping relationship, to obtain an updated preference feature close to a target preference feature spatial distribution, where the target preference feature spatial distribution is for representing a spatial distribution of a preference feature corresponding to the recommendation object.

The mapping transformation is a process of transforming a feature spatial distribution of the initial preference feature according to the feature mapping relationship, for example, performing feature space stretching, feature space offset, or the like on the initial preference feature according to the feature mapping relationship. "Close to a target preference feature spatial distribution" is that in a process of the mapping transformation, a transformation such as the feature space stretching or the feature space offset is performed with a target of making the feature spatial distribution of the initial preference feature the same as the target preference feature spatial distribution, so that the feature spatial distribution of the initial preference feature after the transformation is more similar to the target preference feature spatial distribution.

The target preference feature spatial distribution is for representing the spatial distribution of the preference feature corresponding to the recommendation object. To be specific, in the recommendation system in which training is performed on a large amount of interaction data of the recommendation object, a specific feature space is allocated to the preference feature of the recommendation object, which is expressed as that the preference feature of the recommendation object satisfies a distribution, namely, the target preference feature spatial distribution. However, before the target object in the cold start state records sufficient interaction data, there is a difference between a spatial distribution of a preference feature of the target object and the target preference feature spatial distribution. After preference information has been learned from sufficient interaction data for the target object in the cold start state, the preference feature of the target object gradually converges to the target preference feature spatial distribution.

The updated preference feature is a result obtained by performing the mapping transformation on the initial preference feature. Compared with the initial preference feature, a feature space of the updated preference feature is closer to the target preference feature spatial distribution. Performing recommendation analysis based on the updated preference feature can avoid a disadvantage that there is a large difference between the initial preference feature of the target object and the target preference feature spatial distribution due to a lack of sufficient interaction data in the cold start state. A more accurate recommendation result is obtained by performing recommendation analysis based on the updated preference feature close to the target preference feature spatial distribution.

Specifically, after obtaining the feature mapping relationship for the target object, the computer device performs the mapping transformation on the initial preference feature corresponding to the target object according to the feature mapping relationship and obtains the updated preference feature close to the target preference feature spatial distribution, thereby performing recommendation analysis based on the updated preference feature.

Step 208: Perform recommendation analysis on the target object based on the updated preference feature, to obtain a recommendation result for the target object.

Figure 5:
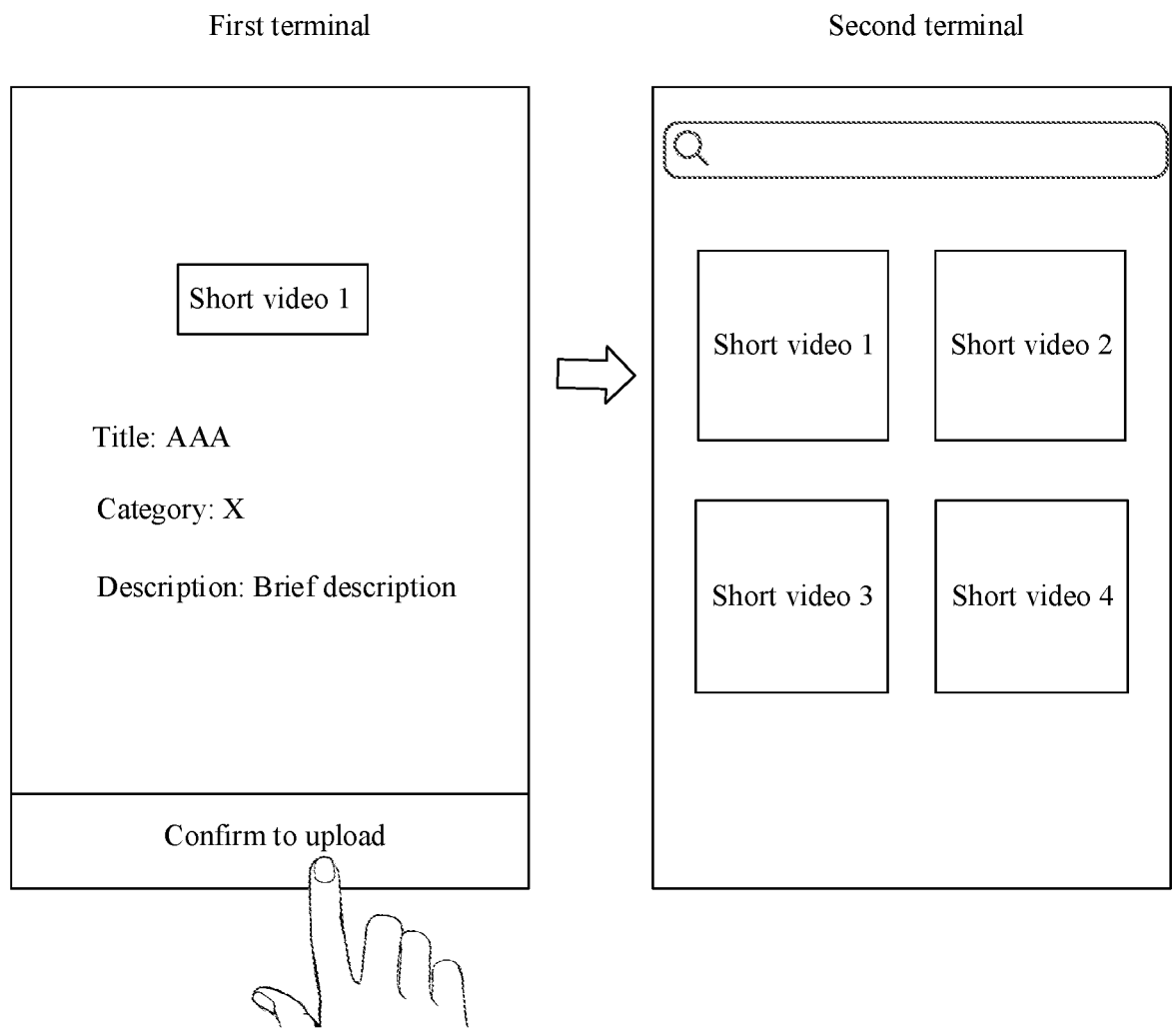
FIG. 5 is a schematic diagram of an interface for recommending and displaying a cold start object according to an embodiment.

The recommendation analysis may be analysis for a receiving object group that is preferred by the target object, or may be analysis for a specified receiving object to determine whether recommendation needs to be performed. Correspondingly, when the recommendation analysis is for a receiving object group that is preferred by the target object, the recommendation result is to recommend, according to the updated preference feature, the target object to a target receiving object that satisfies a recommendation condition. When the recommendation analysis is for a specified receiving object to determine whether recommendation needs to be performed, the recommendation result includes recommending the target object to the specified receiving object or not recommending the target object to the specified receiving object. As shown in FIG. 5, when a user A uploads a new short video 1 on a first terminal, the short video 1 is in the cold start state in the recommendation system. Through the foregoing method for recommending a cold start object, a second terminal is determined as a preference receiving object of the short video 1, so that the short video 1 is recommended and displayed on the second terminal.

In the foregoing method for recommending a cold start object, a content feature and an initial preference feature that are of a target object in a cold start state are obtained, multilayer perceptron processing is performed on the content feature based on a meta-mapping network obtained through training based on interaction data of a recommendation object in a simulated cold start state and a feature mapping relationship matching the target object is determined, and a mapping transformation is performed on the initial preference feature according to the feature mapping relationship and an updated preference feature close to a target preference feature spatial distribution is obtained. Because a spatial distribution of the updated preference feature is close to a spatial distribution of a preference feature corresponding to the recommendation object, it can be determined that an accurate preference feature can be learned for the target object in the cold start state, so that recommendation analysis is performed on the target object based on the updated preference feature to obtain a more accurate recommendation result.

Figure 6:
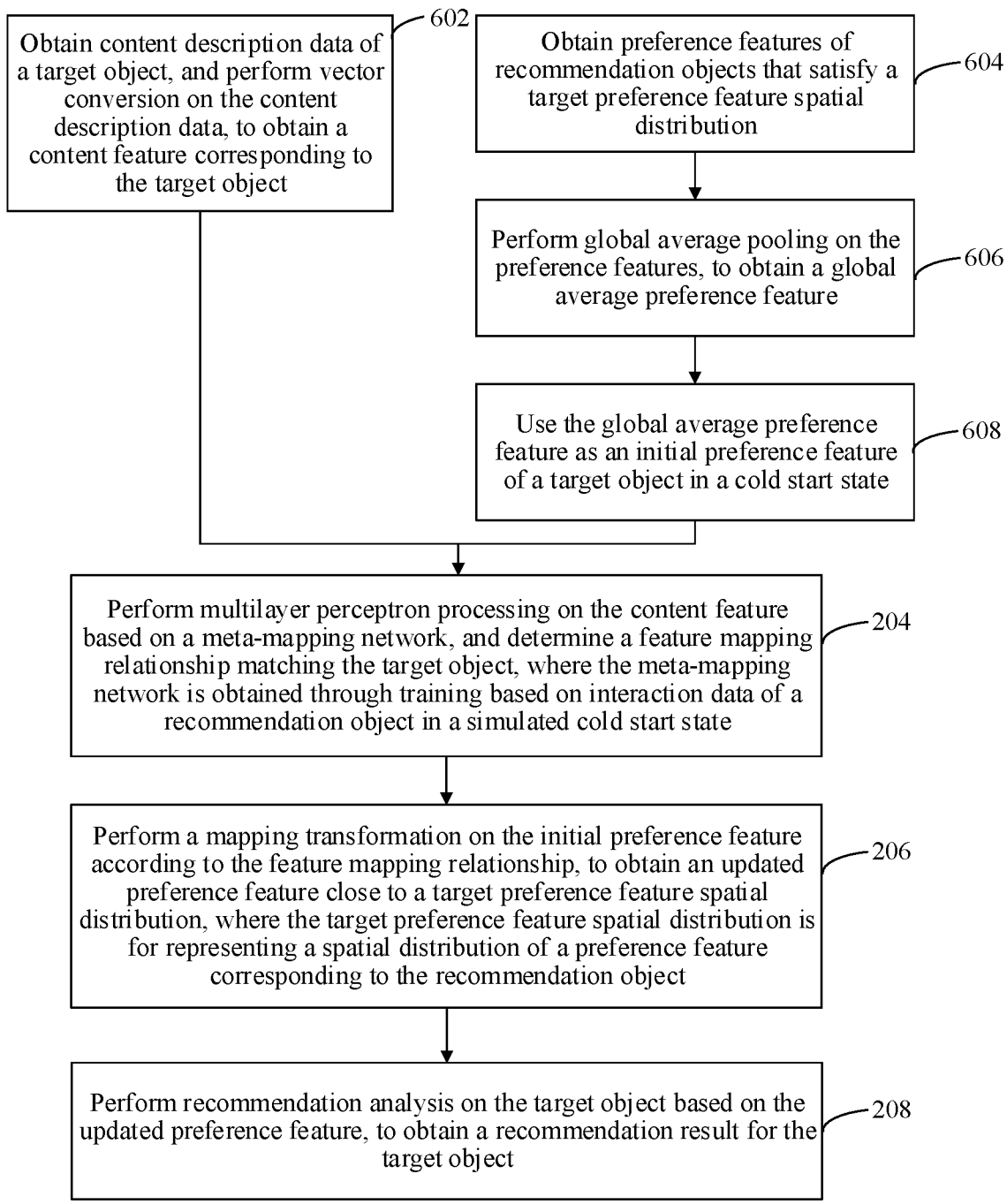
FIG. 6 is a schematic flowchart of a method for recommending a cold start object according to another embodiment.

In an embodiment, as shown in FIG. 6, that a content feature and an initial preference feature that are of a target object in a cold start state are obtained includes the following steps:

Step 602: Obtain content description data of the target object, and perform vector conversion on the content description data, to obtain the content feature of the target object.

Step 604: Obtain respective preference features of recommendation objects that satisfy the target preference feature spatial distribution.

Step 606: Perform global average pooling on the preference features, to obtain a global average preference feature.

Step 608: Use the global average preference feature as the initial preference feature of the target object in the cold start state.

The content description data is for representing original data of detail information of the target object and may specifically include a title, a category, brief description, detailed content, and the like. The vector conversion is a process of converting the content description data into a continuous vector. The vector conversion may be implemented specifically through an embedding technology. The embedding technology is a technology in which the original data can be converted into the continuous vector, and the obtained continuous vector may be referred to as an embedded feature. After inputting the original data of the content description data in an embedding layer for embedding, the computer device obtains the embedded feature corresponding to the content description data. The recommendation objects that satisfy the target preference feature spatial distribution is an object with sufficient interaction data and sufficient learning in the recommendation system. The global average pooling is a processing process of performing average processing on a global feature and outputting an average feature value.

In a specific application, an example in which the target object is a short video whose playing duration is less than a set time threshold. When a cold start short video enters the recommendation system, a recommendation model randomly initializes an initial preference feature for the target object, but the randomly initialized initial preference feature rarely includes information related to the cold start short video, and an accurate recommendation effect cannot be achieved. By performing a global average pooling operation on a preference feature of an existing short video with sufficient interaction data and sufficient learning, a global average preference feature is obtained as a generalized preference feature. When the cold start short video enters the recommendation system, that is, for a cold start video in a zero-shot stage, the generalized preference feature is used as an initial preference feature of the cold start short video. In this preference feature initialization method, the cold start short video is provided with an initial preference feature with a difference as small as possible from the target preference feature spatial distribution.

In this embodiment, a global average pooling operation is performed on a preference feature of recommendation objects, and an obtained global average preference feature is used as an initial preference feature of a target object. In this way, in an initial stage, a difference between the initial preference feature and a target preference feature spatial distribution can be as small as possible, thereby accelerating a progress of adapting the target object to a recommendation system for accurate recommendation.

In an embodiment, the target object includes a target video; and by using an example in which the target object is the target video, the obtaining content description data of the target object includes: obtaining supplementary description information for the target video, and extracting a key video frame in the target video; performing image recognition on the key video frame, to obtain video content information in the key video frame; and determining the supplementary description information and the video content information as the content description data of the target object.

Figure 7:
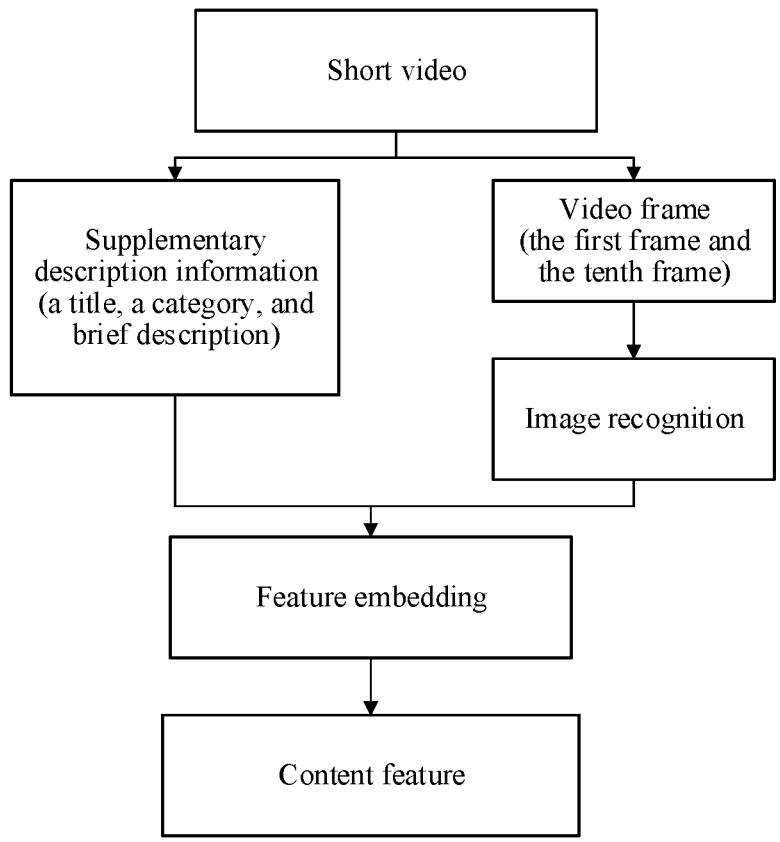
FIG. 7 is a schematic flowchart of determining a content feature of a short video according to an embodiment.

As shown in FIG. 7, the supplementary description information may be available information such as a tile, a category, and brief description that are related to video content and are directly edited and inputted by a user for the target video. The key video frame in the target video may be a video frame extracted from the target video according to a specified node, for example, extracted according to a specified time interval or extracted according to a specified inter-frame interval. The image recognition may be specifically a processing process of obtaining content information in the key video frame, for example, recognizing a text in a video or a category of an item in an image.

Specifically, the computer device obtains associated information of the target video, to obtain the supplementary description information for the target video, extracts the key video frame in the target video according to a video frame extraction parameter, and obtains the video content information in the key video frame by performing image recognition on the key video frame. The computer device determines the supplementary description information and the video content information as the content description data of the target object for feature embedding, and obtains the content feature of the target object.

In this embodiment, for a target video, a key video frame in the target video is extracted for image recognition, so that a content feature can be obtained by fully using supplementary description content such as a title, a category, or description of the video and content in a video frame, and preference information of the target video can be extracted from the target video as much as possible, thereby providing a basis for subsequent accurate recommendation.

In an embodiment, the feature mapping relationship includes a stretching function; and the performing a mapping transformation on the initial preference feature according to the feature mapping relationship, to obtain an updated preference feature close to a target preference feature spatial distribution includes: stretching a feature distribution of the initial preference feature according to the stretching function, and fusing the content feature into a stretched space of the initial preference feature, to obtain the updated preference feature close to the target preference feature spatial distribution.

The stretching function is a function for implementing a stretching operation on a mapping from the initial preference feature $D_c$ to the target preference feature spatial distribution $D_t$. The stretched space may be obtained through a space stretching operation performed based on the stretching function, so that the content feature of the target object is fused into the stretched space, and the updated preference feature close to the target preference feature spatial distribution is obtained.

Specifically, the stretching of the feature distribution may be specifically implemented based on a specified stretching direction and stretching distance. For example, stretching is performed according to a feature vector row direction, stretching is performed according to a feature vector column direction, or stretching is performed based on both a row direction and a column direction. The stretching direction and the stretching distance may be determined based on the stretching function.

In this embodiment, a stretching transformation is performed by adapting a preference feature of a target object toward a target preference feature spatial distribution. In this way, a progress of adapting the target object to a recommendation system is accelerated, and a recommendation result for the target object is quickly and accurately obtained.

In an embodiment, the performing multilayer perceptron processing on the content feature based on a meta-mapping network, and determining a feature mapping relationship matching the target object includes: performing the multilayer perceptron processing on the content feature based on a meta-stretching network parameter in the meta-mapping network, to obtain the stretching function for causing the initial preference feature to be stretched close to the target preference feature spatial distribution.

A meta-stretching network is for implementing a stretching operation on a mapping from a spatial distribution $D_c$ of the initial preference feature to the target preference feature spatial distribution $D_t$. The stretching operation is completed by a stretching function generated by the meta-stretching network for each target object. The meta-stretching network parameter is a parameter that is obtained through training in the meta-mapping network and is required for generating an offset parameter for performing a stretching operation on a preference feature.

Specifically, the content feature of the target object often includes a part of preference information, which is represented as that objects with similar preference features also have relatively similar content features. The content feature is used as an input of the meta-stretching network, so that the meta-stretching network may extract preference-related information in the content feature. The obtained stretching function fuses the preference-related information in the content feature into the preference feature by stretching the preference feature of the target object toward $D_t$. An expression of the meta-stretching network is as follows:

$$\tau_i^{scale} = h(X_i; W_{scale}) \qquad (1)$$

where $W_{scale}$ is a parameter in the meta-stretching network and may be iteratively updated through network training, h is a multilayer perceptron model and may be specifically a two-layer multilayer perceptron model, and $\tau_i^{scale}$ care is the stretching function. The stretching operation of the mapping from $D_c$ to $D_t$ may be represented as $v_i^{warm} = v_i \odot \tau_i^{scale}$, and $\odot$ represents element-wise multiplication.

In this embodiment, multilayer perceptron processing is performed on a content feature through a meta-stretching network parameter in a meta-mapping network, to obtain a stretching function, so that a spatial distribution of an updated preference feature obtained based on the stretching function is close to a spatial distribution of a preference feature corresponding to recommendation objects, it can be determined that an accurate preference feature can be learned for a target object in a cold start state, and a more accurate recommendation result can be further obtained for the target object.

In an embodiment, the feature mapping relationship further includes an offset function; and the stretching a feature distribution of the initial preference feature according to the stretching function, and fusing the content feature into a stretched space of the initial preference feature, to obtain the updated preference feature close to the target preference feature spatial distribution includes: stretching the feature distribution of the initial preference feature based on the stretching function, and fusing the content feature into the stretched space of the initial preference feature, to obtain an intermediate preference feature; and performing an offset adjustment on a feature distribution of the intermediate preference feature based on the offset function to remove noise data in the intermediate preference feature, to obtain the updated preference feature.

The offset function is a function for implementing an offset operation on a mapping from the initial preference feature $D_c$ to the target preference feature spatial distribution $D_t$. The noise data of the intermediate preference feature that is obtained after the stretching is filtered through the offset function, and the updated preference feature close to the target preference feature spatial distribution is obtained. Offsetting of a feature distribution may be specifically implemented based on a specified offset direction and offset distance. For example, offset is performed according to a feature vector row direction, offset is performed according to a feature vector column direction, or offset is sequentially performed based on both a row direction and a column direction. The offset direction and the offset distance may be determined based on the offset function.

Specifically, the computer device first stretches the feature distribution of the initial preference feature corresponding to the target object based on the stretching function, determines the stretched space of the initial preference feature, then fuses the content feature corresponding to the target object into the stretched space of the initial preference feature, to obtain the stretched intermediate preference feature, and then performs the offset adjustment on the feature distribution of the intermediate preference feature based on the offset function, to remove the noise data in the intermediate preference feature, to obtain the updated preference feature corresponding to the target object.

In this embodiment, a stretching transformation and an offset adjustment are sequentially performed by adapting a preference feature of a target object toward a target preference feature spatial distribution. In this way, an updated preference feature is closer to the target preference feature spatial distribution, so that a progress of adapting the target object to a recommendation system is accelerated, and a recommendation result for the target object can be quickly and accurately obtained.

In an embodiment, the performing multilayer perceptron processing on the content feature based on a meta-mapping network, and determining a feature mapping relationship matching the target object includes: obtaining interaction data for the target object; and performing the multilayer perceptron processing on the interaction data based on a meta-offset network parameter in the meta-mapping network, to obtain the offset function for causing the intermediate preference feature to be offset close to the target preference feature spatial distribution.

The interaction data for the target object may be a small amount of interaction data obtained in a cold start stage, or may be interaction data that is randomly generated and obeys a random distribution. The meta-offset network parameter is a parameter that is obtained through training in the meta-mapping network and is required for generating an offset parameter for performing an offset operation on a preference feature.

In a specific application, a meta-offset network is mainly responsible for performing the offset adjustment on the stretched intermediate preference feature, to filter out noise data in the intermediate preference feature and additionally cause the updated preference feature $D_c$ to be closer to the target preference feature spatial distribution $D_t$. By using an example in which the target object is a short video, learning preference information from the interaction data is the most direct method in which a preference feature of a cold start short video gets close to $D_t$ from $D_c$. However, there is some unavoidable noise in the interaction data. For example, the short video is accidentally double-clicked. The noise has great negative impact on learning of the preference feature. The meta-offset network generates an offset parameter for each cold start short video through recognizing noise in interaction data of the cold start short video, so that preference feature offset having a noise filtering function can be implemented based on the offset parameter.

In this embodiment, interaction data for a target object is obtained, and multilayer perceptron processing is performed on the interaction data based on a meta-offset network parameter in a meta-mapping network, to obtain an offset function for causing an intermediate preference feature to be offset close to a target preference feature spatial distribution is obtained. In this way, the computer device can perform an offset adjustment on the intermediate preference feature based on the interaction data, preserve useful information learned from the interaction data for the intermediate preference feature, filter out error information generated by noise, and improve adaption between an updated preference feature and the target preference feature spatial distribution, and can improve accuracy of a recommendation result for the target object based on an offset adjustment of a meta-offset network.

In an embodiment, before the offset function is determined, the method in this application further includes a processing process of feature aggregation: aggregating interaction preference features in the interaction data, to obtain an aggregated interaction feature; and correspondingly, the performing the multilayer perceptron processing on the interaction data based on a meta-offset network parameter in the meta-mapping network, to obtain the offset function for causing the intermediate preference feature to be offset close to the target preference feature spatial distribution includes: performing the multilayer perceptron processing on the aggregated interaction feature based on the meta-offset network parameter in the meta-mapping network, to obtain the offset function for causing the intermediate preference feature to be offset close to the target preference feature spatial distribution.

The interaction preference features are preference features of receiving objects with which the target object interacts. For example, some users are more interested in content of a type A, and there is more or broader generated interaction for the content of the type A, while some other users are more interested in content of a type B and there is more or broader generated interaction for the content of the type B. The interaction preference features may be extracted and obtained based on these interaction behaviors. The aggregating interaction preference features is performing feature aggregation on the interaction preference features, for example, performing mean normalization on the interaction preference features based on a mean function. In a specific application, by using an example in which the target object is a short video, the aggregated interaction feature may be an average preference feature of users that like a short video i.

In a specific application, by using an example in which the target object is a short video i, a global positive feedback set of the short video i, namely, a set of preference features of the users that like the short video i, is represented as $U(i)=\{u_j | y(i, u)=1\}$. In a few-shot stage of a cold start problem, $|U(i)|>0$. The meta-offset network plays a role in the few-shot stage of the cold start problem. An expression of the meta-offset network is as follows:

$$\tau_i^{shift}=g(\mathcal{G}(U(i));w_{shift}) \qquad (2)$$

where $w_{shift}$ is a learnable parameter in the meta-offset network, g is generally a two-layer multilayer perceptron model, $\mathcal{G}$ is an aggregation function, and $\tau_i^{shift}$ is the offset function. Based on the stretching function $\tau_i^{scale}$ and the offset function $\tau_i^{shift}$, a mapping from the initial preference feature $D_c$ to the target preference feature spatial distribution $D_t$ may be represented as:

$$v_i^{warm}=(v_i \odot \tau_i^{shift}) \qquad (3)$$

where $\oplus$ represents element-wise addition.

(3)

In this embodiment, interaction data for a target object is obtained, and interaction preference features in the interaction data are aggregated, so that an aggregated interaction feature for multilayer perceptron processing can represent an average level of the interaction data, so that an obtained offset parameter can generate an offset function, error information generated by noise can be more effectively filtered out, and adaption between an updated preference feature and a target preference feature spatial distribution can be improved.

In an embodiment, a parameter training process of the meta-mapping network includes: obtaining a recommendation feedback tag in interaction data of the recommendation object and determining a recommendation result for the recommendation object; determining first loss data of the recommendation result and the recommendation feedback tag; and performing an iterative training on a parameter of an initial meta-mapping network based on the first loss data through a gradient descent optimization algorithm until a training stop condition is satisfied, to obtain the meta-mapping network.

The recommendation feedback tag is for representing a feedback result of whether a receiving object can interact with the recommendation object, where the recommendation feedback tag may be a binary tag, including a positive feedback tag and a negative feedback tag. In a specific application, the recommendation feedback tag includes 0 and 1, where 0 represents negative feedback, for example, feedback that a user directly swipes through a recommended short video; and 1 represents positive feedback, for example, feedback that the user likes a recommended short video. The recommendation result for the recommendation object is a result obtained by performing recommendation analysis based on an initial preference feature and the interaction data that are of the recommendation object. The initial meta-mapping network is a meta-mapping network in an initial state, and a parameter of the initial meta-mapping network may be iteratively updated through iterative training, to obtain the meta-mapping network.

Specifically, prediction of the recommendation result for the recommendation object may be represented as:

$$\hat{y}=f(v_i,X_i,u_j,S_j|\theta) \qquad (4)$$

where $\theta$ represents a parameter of a recommendation model.

Logarithmic loss data is generally used as a loss data function, namely, an optimization target, for a binary task. Calculation of loss data between $\hat{y}$ and y is as follows:

$$L(\theta,\phi))=-y \log \hat{y}-(1-y)\log(1-\hat{y}) \qquad (5)$$

where $\phi$ represents an embedding layer parameter, namely, embedding of the receiving object and the target object. After the loss data between the recommendation result $\hat{y}$ and the recommendation feedback tag y is obtained through calculation, learnable parameters $\theta$ and $\phi$ in a model may be optimized through a gradient descent-based optimization method, to make the recommendation model learn a relationship between the receiving object and the target object.

In this embodiment, a recommendation feedback tag is obtained in cold start simulation data of a recommendation object, and a recommendation result for the recommendation object is determined, to determine loss data of the recommendation result and the recommendation feedback tag, so that an iterative training is performed on a parameter of the initial meta-mapping network based on the loss data through a gradient descent optimization algorithm until a training stop condition is satisfied. In this way, an obtained meta-mapping network can generate a more accurate feature mapping relationship for a target object in an application process, thereby making an updated preference feature obtained through a mapping transformation closer to a target preference feature spatial distribution, to obtain an accurate recommendation result.

In an embodiment, the method further includes: selecting a sample object whose interaction data satisfies an interaction condition and whose recommendation effect reaches an expected effect from sample objects; and constructing a triplet based on data of a recommended object, data of a receiving object, and a recommendation feedback tag that are in the interaction data of the sample object, where the triplet is used as interaction data for performing parameter training on the initial meta-mapping network.

To be specific, the interaction data for performing parameter training on the initial meta-mapping network includes three entities (i, j, y): a short video, a user, and a tag, where i,j are respectively an index of the short video and an index of the user, and y is the tag. The user and the short video have respective features, where features of the user include an ID, a gender, an age, and the like of user. The features of the short video include an ID, a title, a category, description, and the like of the short video. Embedding of an ID feature is referred to as a preference feature, and embedding of another feature is referred to as a content feature. A short video is used as an example. Embedding obtained after an ID of the short video passes through an embedding layer is referred to as a preference feature, and embedding obtained after a title, a category, or a description of the short video passes through the embedding layer is referred to as the content feature. It is the same with the user.

In an embodiment, the method further includes: transforming, based on the initial meta-mapping network, an initial preference feature of the recommendation object into an updated preference feature that satisfies the target preference feature spatial distribution. Further, the determining loss data of the recommendation result and the recommendation feedback tag includes: respectively determining first loss data of a recommendation result corresponding to the initial preference feature and first loss data of the recommendation feedback tag, and determining second loss data of a recommendation result corresponding to the updated preference feature and second loss data of the recommendation feedback tag, where the first loss data is for updating the parameter of the initial meta-mapping network; and the second loss data is for updating the initial preference feature.

To be specific, the initial meta-mapping network includes an initial meta-stretching network and an initial meta-offset network, and a training process of the initial meta-stretching network and the initial meta-offset network is as follows:

obtaining a pre-trained recommendation model $f_{\theta, \phi}(\cdot)$, and randomly initializing a learnable parameter $w_{scale}$ of the meta-stretching network h and a learnable parameter $w_{shift}$ of the meta-offset network g; and cyclically performing the following processes until the recommendation model converges:

(1) extracting a small amount of interaction data from interaction data $\mathcal{D}$ about a short video i;

(2) determining a first recommendation result based on an initial preference feature $v_i$ of the short video i, and calculating first loss data $\mathcal{L}_c$ based on the first recommendation result and a recommendation feedback tag in the interaction data;

(3) obtaining an updated preference feature $v_i^{warm}$ of the short video i through a calculation formula $v_i^{warm} = (v_i \odot \tau_i^{scale}) \oplus \tau_i^{shift}$, where $\tau_i^{scale} = h(X_i; w_{scale}); \tau_i^{shift} = g(\mathcal{G}(U(i)); w_{shift});$ $w_{scale}$ is a parameter in the meta-stretching network, $w_{shift}$ is a parameter in the meta-offset network, h and g are multi-layer perceptron models, $\tau_i^{scale}$ is a stretching function, shift $\tau_i^{shift}$ is an offset function, $\odot$ represents element-wise multiplication, and $\oplus$ represents element-wise addition;

(4) determining a second recommendation result based on the updated preference feature $v_i^{warm}$ of the short video i, and calculating second loss data $\mathcal{L}_w$ based on the second recommendation result and the recommendation feedback tag in the interaction data;

(5) updating the parameters $w_{scale}$, $w_{shift}$ based on the first loss data $\mathcal{L}_c$ through a gradient descent optimization algorithm, and updating a preference feature $v_i$ based on the second loss data $\mathcal{L}_w$; and (6) ending a cycle when the recommendation model converges.

To be specific, for the preference feature $v_i$ and a content feature set $X_i = \{x_i^1, x_j^2, \ldots, x_i^n\}$ that are of the short video i, n represents a total quantity of categories of a content feature of the short video, for a preference feature $u_j$ and a content feature set $S_u = \{s_j^1, s_j^2, \ldots, s_j^m\}$ that are of a user u, m represents a total quantity of categories of a content feature of the user, and u, v, x $\in \mathbb{R}^k$, that is, a vector dimension of each feature is k-dimension, and a triplet sample may be represented as ($[v_i, X_i, u_j, S_j], y$) after the short video and the user are embodied as a combination of features. For prediction of an interaction behavior, the recommendation result may be represented as:

$$\hat{y} = f(v_i, X_i, u_j, S_j | \theta) \qquad (6)$$

where $\theta$ represents a parameter of the recommendation model. Logarithmic loss data is generally used as a loss data function, namely, an optimization target, for a binary task. Calculation of loss data between $\hat{y}$ and y is as follows:

$$L(\theta, \phi) = -y \log \hat{y} - (1-y) \log(1-\hat{y}) \qquad (7)$$

where $\phi$ represents an embedding layer parameter, namely, embedding of all users and short videos. After the loss data between the predicted $\hat{y}$ and the tag y is obtained through calculation, learnable parameters $\theta$ and $\phi$ in the model may be optimized through a gradient descent-based optimization method, to make the recommendation model learn a relationship between the short video and the user.

A process of calculating $\mathcal{L}_c$ based on $v_i$ is as follows:

$$\begin{cases} \hat{y}_c = f_{\theta, \phi}(v_i, X_i, u_j, S_j) \\ \mathcal{L}_c = -y \log \hat{y}_c - (1-y) \log(1-\hat{y}_c) \end{cases} \qquad (8)$$

Similarly, $\mathcal{L}_w$ may be calculated based on $v_i^{warm}$.

Because $\mathcal{L}_c$ is related to $w_{scale}$, $w_{shift}$ only, and $\mathcal{L}$ is related to $v_i$ only, learning of $w_{scale}$, $w_{shift}$ and learning of $v_i$ do not affect each other, so that introduction of the meta-mapping network does not affect a recommendation effect of an original recommendation model on an existing short video.

In this embodiment, first loss data of a recommendation result corresponding to an initial preference feature and first loss data of a recommendation feedback tag, and second loss data of a recommendation result corresponding to an updated preference feature and second loss data of the recommendation feedback tag are respectively determined and are respectively used for updating a parameter of an initial meta-mapping network and the initial preference feature. In this way, learning of the parameter of the initial meta-mapping network and learning of the initial preference feature do not affect each other, introduction of a meta-mapping network does not affect a recommendation effect of an original recommendation model on an existing recommendation object, and additionally, accurate recommendation for a cold start target object is implemented.

This application further provides an application scenario for short video recommendation, and the foregoing method for recommending a cold start object is applied in the application scenario. Specifically, application of the method for recommending a cold start object in the application scenario is as follows:

Recently, short videos have gradually become a type of internet content that has the longest retention time of users and consume most traffic. Major short video platforms rely on massive user and short video data and a powerful recommendation system technology to recommend popular, diverse, and personalized content to users, increase the retention time of the users, and strengthen user stickiness. However, a conventional recommendation technology such as a collaborative filtering technology including SVD++, and matrix factorization and a deep learning-based neural recommendation system such as a click-through rate prediction model, for example, a deep interest network or a deep interest evolution network, both require a large amount of user-short video interaction data, to allow a model to learn preference of the users for short videos from the interaction data.

For a short video lacking interaction data, namely, a short video newly uploaded by a creator, because there is currently no interaction record such as playing completion, liking, or sharing of the short video by another user, it is difficult for the recommendation system to identify user preference to which the short video belongs, which results in an inaccurate target recommendation group and affects a recommendation conversion rate. This is a cold start problem of the short video. Estimated according to a current billion-level data volume on a single day, records related to newly released short videos on that day generally account for 1% to 5%, and may reach a ten million-level data volume. To resolve the foregoing problem, a method for recommending a cold start short video based on meta-network mapping is proposed for a short video platform with a requirement for cold start recommendation. The method is equipped on various existing deep learning-based recommendation models to make up for shortcomings of the existing recommendation models in a zero-shot stage and few-shot stage of the cold start problem.

The method for recommending a cold start short video specifically includes preference feature initialization for a short video and two meta-networks, namely, a meta-stretching network and a meta-offset network, where w process of the preference feature initialization for the short video includes: for a cold start short video in the zero-shot stage, obtaining a generalized preference feature as an initial preference feature of the cold start short video by performing a global average pooling operation on preference features of all existing short videos (referred to as common short videos below) with sufficient interaction data and sufficient learning;

the meta-stretching network uses a content feature of the cold start short video as an input, generates a stretching function specified for the current cold start short video, performs a stretching transformation by adapting a preference feature of the cold start short video toward a current recommendation system, namely, ideal preference feature space of a common short video, and accelerates a progress of adapting the cold start short video to the recommendation system; and the meta-offset network analyses preference features of all current interaction users of the cold start short video and generates an offset function that can guide filtering of noise in interaction data.

To be specific, in the recommendation system in which training is performed on a large amount of interaction data of the common short video, specified feature space is allocated to a preference feature of the common short video, which is expressed as that the preference feature of the common short video satisfies a target preference feature spatial distribution $D_t$. Before the cold start short video records sufficient interaction data, there is a difference between preference feature distribution $D_c$ of the cold start short video and $D_t$; and after preference information has been learned from sufficient interaction data for the cold start short video, the preference feature distribution of the cold start short video gradually converges to $D_t$, and a preference feature initialization process provides the cold start short video with an initial preference feature having a difference as small as possible from $D_t$ and reduces difficulty of the cold start short video in getting close to $D_t$. Further, the two meta-networks provide the cold start short video with a mapping from $D_c$ to $D_t$, which has an obvious effect on the zero-shot stage and the few-shot stage of the cold start problem.

An implementation process of the foregoing technical solution is achieved based on the following parts, which are respectively: cold start recommendation scenario definition, preference feature initialization, training of a meta-stretching network and a meta-offset network, and model application.

Part 1: Cold start recommendation scenario definition.

Specifically, a recommendation model focuses on a binary (0-1) recommendation task, and predicts a probability (0~1) of a user liking a short video, where α represents negative feedback, that is, feedback that the user directly swipes through the short video; and 1 represents positive feedback, that is, feedback that the user likes the short video. Each sample is one triplet, including three entities: a short video, a user, and a tag, namely, (i,j, y), where i,j are respectively an index for the short video and an index for the user, and y is the tag. The user and the short video have respective features. The features corresponding to information about the user include an ID, a gender, an age, and the like of the user. The features corresponding to information about short video include an ID, a title, a category, description, and the like of the short video. Through an embedding technology, namely, a technology in which original features of the foregoing user and short video can be converted into a continuous vector, of a recommendation system, where the continuous vector is referred to as embedding, after the original features pass through an embedding layer of the recommendation system, embedding of each feature of the user and short video may be obtained. Generally, embedding of an ID feature is referred to as a preference feature, and embedding of another feature is referred to as a content feature. A short video is used as an example. Embedding obtained after an ID of the short video passes through an embedding layer is referred to as a preference feature, and embedding obtained after a title, a category, or a description of the short video passes through the embedding layer is referred to as the content feature. It is the same with the user. Because an ID is unique for a short video, learning of an ID feature relies on only interaction data of a short video corresponding to the ID, which is a direct root cause of the cold start problem of the short video. However, the content feature generally repeatedly appears in a plurality of short videos, the interaction data is sufficient, and almost all content features can be fully learned.

After the features of the user and short video pass through the embedding layer, a preference feature $v_i$ and a content feature set $X_i=\{x_i^1, x_i^2, \ldots, x_i^n\}$ that are of a short video i may be obtained, where n represents a total quantity of categories of a content feature of the short video. Similarly, a preference feature $u_j$ and a content feature set $S_u=\{s_j^1, s_j^2, \ldots, s_j^m\}$ that are of a user u may be obtained, where m represents a total quantity of categories of a content feature of the user, and u, v, x $\in \mathbb{R}^k$, that is, a vector dimension of each feature is k-dimension, and a size of k is set according to an actual service effect. After the short video and the user each are embodied as a combination of features, an original triplet sample may be represented as ($[v_i, X_i, u_j, S_j]$, y). A recommendation result for an interaction behavior may be represented as:

$$\hat{y}=f(v_i,X_i,u_j,S_j|\theta) \quad (9)$$

where θ represents a parameter of a common recommendation model. Logarithmic loss data is generally used as a loss data function, namely, an optimization target, for a binary task. Calculation of loss data between ŷ and y is as follows:

$$L(\theta,\phi)=-y\log\hat{y}-(1-y)\log(1-\hat{y}) \quad (10)$$

where θ represents an embedding layer parameter, namely, embedding of all users and short videos. After the loss data between the predicted ŷ and the tag y is obtained through calculation, learnable parameters θ and φ in the model may be optimized through a gradient descent-based optimization method, to make the recommendation model learn a relationship between the short video and the user.

Part 2: Preference feature initialization.

Generally, when a cold start short video enters the recommendation system, the recommendation system randomly initializes a preference feature for the cold start short video. However, the randomly initialized preference feature rarely includes information related to the cold start short video, and it is difficult to obtain a satisfactory recommendation effect. By performing a global average pooling operation on preference features of existing common short videos, a global average preference feature $\bar{u}$ is obtained as a generalized preference feature. When the cold start short video enters the recommendation system, that is, for a cold start video in a zero-shot stage, the generalized preference feature is used as an initial preference feature of the cold start short video. In this preference feature initialization method, the cold start short video is provided with an initial preference feature having a difference as small as possible from general preference feature $D_t$, and an effect brought by the two meta-networks is greatly enhanced, which is much better than a random initialization method.

Part 3: Training of a meta-stretching network and a meta-offset network.

After the generalized initial preference feature is obtained, the meta-stretching network and the meta-offset network generate a stretching function and an offset function that are specific to each cold start video. The two functions together constitute a mapping from a cold start preference feature distribution $D_c$ to a common preference feature distribution $D_t$, and the recommendation effect of the cold start short video is improved.

The meta-stretching network is responsible for a stretching operation of a mapping from $D_c$ to $D_t$, and the stretching operation is completed by the stretching function generated by the meta-stretching network for each target object. Generally, the content feature of the short video often includes a part of preference information, which is represented as that short videos with similar preference features also have relatively similar content features. Therefore, the content feature is used as an input of the meta-stretching network, so that the meta-stretching network may extract preference-related information in the content feature. The obtained stretching function fuses the preference-related information in the content feature into the preference feature by stretching the preference feature of the cold start short video toward $D_t$. An expression of the meta-stretching network is as follows:

$$\tau_i^{scale}=h(X_i;w_{scale}) \quad (11)$$

where $w_{scale}$ is a learnable parameter in the meta-stretching network, h is generally a two-layer multilayer perceptron model, and $\tau_i^{scale}$ is the obtained stretching function. The stretching operation of the mapping from $D_c$ to $D_t$ may be represented as $v_i^{warm}=v_i\odot\tau_i^{scale}$ and $\odot$ represents element-wise multiplication.

The meta-offset network is mainly responsible for performing a translational adjustment on the stretched preference feature, to filter out noise in the preference feature and additionally cause $D_c$ to be closer to $D_t$. Generally, learning preference information from the interaction data is a most direct method in which the preference feature of the cold start short video gets close to $D_t$ from $D_c$. However, there is some noise unavoidable in the interaction data. For example, the short video is accidentally double-clicked. Especially in the few-shot stage, the noise has great negative impact on learning of the preference feature. The meta-offset network recognizes noise in the interaction data of the cold start short video, and generates an offset function having a filtering function for each cold start short video. The offset function performs a translational adjustment on the preference feature of the cold start short video, retains useful information learned by the preference feature from the interaction data, and filters out error information generated by noise.

To represent the meta-offset network, a global positive feedback set of the short video i, namely, a set of preference features of all users that like the short video i, is introduced and represented as U(i)={$u_j$|y(i, u)=1}. In the zero-shot stage of the cold start problem, |U(i)|=0; and in the few-shot stage of the cold start problem, |U(i)|>0. Apparently, the meta-offset network plays a role in the few-shot stage of the cold start problem. An expression of the meta-offset network is as follows:

$$\tau_i^{shift}=g(\mathcal{G}(U(i));w_{shift}) \quad (12)$$

where $w_{shift}$ is a learnable parameter in the meta-offset network, g is generally a two-layer multilayer perceptron model, $\mathcal{G}$ is an aggregation function (such as a simple average function, that is, to find an average preference feature of all users that like the short video i), and $\tau_i^{shift}$ is the obtained offset function. Finally, with $\tau_i^{scale}$ and $\tau_i^{shift}$, the mapping from $D_c$ to $D_t$ may be represented as:

$$v_i^{warm}=(v_i\odot\tau_i^{scale})\oplus\tau_i^{shift} \quad (13)$$

where ⊕ represents element-wise addition.

A well-trained recommendation model $f_{\theta,\phi}(\cdot)$ is given, and the recommendation model can make good recommendation for a common short video, but for the cold start short video, the recommendation model has a poor recommendation effect in recommending the cold start short video because the preference feature is not fully trained. The training process of the model in module three and four is now described as shown in the following algorithm:

obtaining a pre-trained recommendation model $f_{\theta,\phi}(\cdot)$ and randomly initializing a learnable parameter $w_{scale}$ of the meta-stretching network h and a learnable parameter $w_{shift}$ of the meta-offset network g; and cyclically performing the following processes until the recommendation model converges:

(1) extracting a small amount of interaction data from interaction data $\mathcal{D}$ about a short video i;

(2) determining a first recommendation result based on an initial preference feature $v_i$ of the short video i, and calculating first loss data $\mathcal{L}_c$ based on the first recommendation result and a recommendation feedback tag in the interaction data;

(3) obtaining an updated preference feature $v_i^{warm}$ through a calculation formula $v_i^{warm}=(v_i\odot\tau_i^{scale})\oplus\tau_i^{shift}$;

(4) determining a second recommendation result based on the updated preference feature $v_i^{warm}$ of the short video i, and calculating second loss data $\mathcal{L}_w$ based on the second recommendation result and the recommendation feedback tag in the interaction data;

(5) updating the parameters $w_{scale}$, $w_{shift}$ based on the first loss data $\mathcal{L}_c$ through a gradient descent optimization algorithm, and updating a preference feature $v_i$ based on the second loss data $\mathcal{L}_w$; and (6) ending a cycle when the recommendation model converges.

A process of calculating $\mathcal{L}_c$ based on $v_i$ is as follows:

$$\begin{cases} \hat{y}_c = f_{\theta,\phi}(v_i, X_i, u_j, S_j) \\ \mathcal{L}_c = -y\log\hat{y}_c - (1-y)\log(1-\hat{y}_c) \end{cases} \quad (14)$$

Similarly, $\mathcal{L}_w$ may be calculated based on $v_i^{warm}$. The foregoing training process takes a single short video i as an example, and actual training is to be performed in batches. Because $\mathcal{L}_c$ is related to $w_{scale}$, $w_{shift}$ only, and $\mathcal{L}_w$ is related to $v_i$ only, learning of $w_{scale}$, $w_{shift}$ and $v_i$ does not affect each other, so that introduction of the meta-network does not affect a recommendation effect of an original recommendation model on a common short video.

Part 4: Model application.

After meta-network training is completed, when the cold start short video enters the recommendation system, the preference feature of the cold start short video is converted into $v^{warm}$ for prediction, until vlearns preference information from sufficient interaction data, and vis directly used for prediction.

It is to be understood that although the steps in the flowcharts involved in the foregoing embodiments are displayed sequentially according to instructions of arrows, these steps are not necessarily performed sequentially according to a sequence instructed by the arrows. Unless otherwise clearly specified in this specification, the steps are performed without any strict sequence limit, and may be performed in other sequences. In addition, at least some steps in the flowcharts involved in the foregoing embodiments may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Based on a same inventive concept, this embodiment of this application further provides an apparatus for recommending a cold start object for implementing the foregoing involved method for recommending a cold start object. An implementation solution that is for solving the problem and is provided by the apparatus is similar to the implementation solution recorded in the foregoing method, so that for a specific limitation on one or more embodiments of the apparatus for recommending a cold start object provided below, reference may be made to the limitation on the method for recommending a cold start object above, and details are not described herein again.

Figure 8:
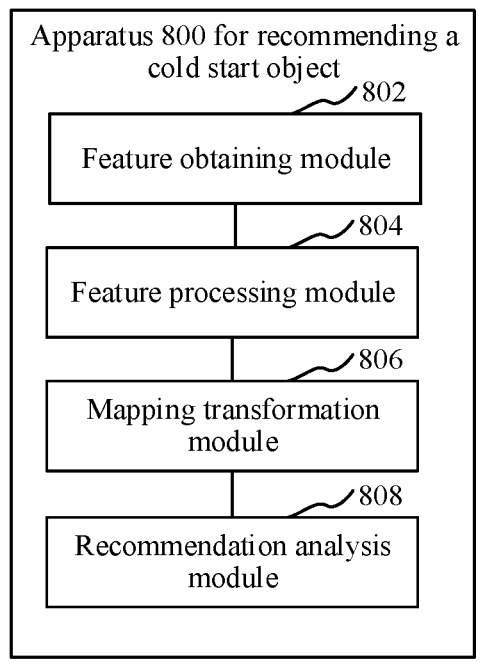
FIG. 8 is a structural block diagram of an apparatus for recommending a cold start object according to an embodiment.

In an embodiment, as shown in FIG. 8, an apparatus 800 for recommending a cold start object is provided. The apparatus includes a feature obtaining module 802, a feature processing module 804, a mapping transformation module 806, and a recommendation analysis module 808.

The feature obtaining module 802 is configured to obtain a content feature and an initial preference feature that are of a target object in a cold start state.

the feature processing module 804 is configured to perform multilayer perceptron processing on the content feature based on a meta-mapping network, and determine a feature mapping relationship matching the target object, the meta-mapping network being obtained through training based on interaction data of a recommendation object in a simulated cold start state;

The mapping transformation module 806 is configured to perform a mapping transformation on the initial preference feature according to the feature mapping relationship, to obtain an updated preference feature close to a target preference feature spatial distribution, the target preference feature spatial distribution being for representing a spatial distribution of a preference feature corresponding to the recommendation object.

The recommendation analysis module 808 is configured to perform recommendation analysis on the target object based on the updated preference feature, to obtain a recommendation result for the target object.

In an embodiment, the feature obtaining module includes a content feature obtaining module and an initial preference feature obtaining module;

the content feature obtaining module is configured to: obtain content description data of the target object, and perform vector conversion on the content description data, to obtain the content feature of the target object; and the initial preference feature obtaining module is configured to: obtain respective preference features of recommendation objects that satisfy the target preference feature spatial distribution; and perform global average pooling on the preference features, and use an obtained global average preference feature as the initial preference feature of the target object in the cold start state.

In an embodiment, the target object includes a target video; and the content feature obtaining module is further configured to: obtain supplementary description information for the target video, and extract a key video frame in the target video; perform image recognition on the key video frame, to obtain video content information in the key video frame; and determine the supplementary description information and the video content information as the content description data of the target object.

In an embodiment, the feature mapping relationship includes a stretching function; and the mapping transformation module includes a stretching module, configured to stretch a feature distribution of the initial preference feature according to the stretching function, and fuse the content feature into a stretched space of the initial preference feature, to obtain the updated preference feature close to the target preference feature spatial distribution.

In an embodiment, the feature processing module includes a stretching function determining module, configured to perform the multilayer perceptron processing on the content feature based on a meta-stretching network parameter in the meta-mapping network, to obtain the stretching function for causing the initial preference feature to be stretched close to the target preference feature spatial distribution.

In an embodiment, the feature mapping relationship further includes an offset function; the stretching module is configured to: stretch the feature distribution of the initial preference feature based on the stretching function, and fuse the content feature into the stretched space of the initial preference feature, to obtain an intermediate preference feature; and the mapping transformation module further includes an offset module, configured to perform an offset adjustment on a feature distribution of the intermediate preference feature based on the offset function to remove noise data in the intermediate preference feature, to obtain the updated preference feature.

In an embodiment, the feature processing module includes an offset function determining module, configured to: obtain interaction data for the target object; and perform the multilayer perceptron processing on the interaction data based on a meta-offset network parameter in the meta-mapping network, to obtain the offset function for causing the intermediate preference feature to be offset close to the target preference feature spatial distribution.

In an embodiment, the apparatus for recommending a cold start object further includes a feature aggregation module, configured to aggregate interaction preference features in the interaction data, to obtain an aggregated interaction feature; and the offset function determining module is further configured to perform the multilayer perceptron processing on the aggregated interaction feature based on the meta-offset network parameter in the meta-mapping network, to obtain the offset function for causing the intermediate preference feature to be offset close to the target preference feature spatial distribution.

In an embodiment, the apparatus for recommending a cold start object further includes a meta-mapping network training module, configured to: obtain a recommendation feedback tag in cold start simulation data of the recommendation object, and determine a recommendation result for the recommendation object; determine loss data of the recommendation result and the recommendation feedback tag; and perform an iterative training on a parameter of an initial meta-mapping network based on the loss data through a gradient descent optimization algorithm until a training stop condition is satisfied, to obtain the meta-mapping network.

In an embodiment, the meta-mapping network training module is further configured to: transform, based on the initial meta-mapping network, an initial preference feature of the recommendation object into an updated preference feature that satisfies the target preference feature spatial distribution; and respectively determine first loss data of a recommendation result corresponding to the initial preference feature and first loss data of the recommendation feedback tag, and determine second loss data of a recommendation result corresponding to the updated preference feature and second loss data of the recommendation feedback tag, where the first loss data is for updating the parameter of the initial meta-mapping network; and the second loss data is for updating the initial preference feature.

In an embodiment, the apparatus for recommending a cold start object further includes a training data obtaining module, configured to: select a sample object whose interaction data satisfies an interaction condition and whose recommendation effect reaches an expected effect from sample objects; and construct a triplet based on data of a recommended object, data of a receiving object, and a recommendation feedback tag that are in the interaction data of the sample object, where the triplet is used as interaction data for performing parameter training on the initial meta-mapping network.

The modules in the foregoing apparatus for recommending a cold start object may be implemented entirely or partially by software, hardware, or a combination thereof. The foregoing modules may be built in or independent of one or more processors of a computer device in a hardware form, or may be stored in a memory of the computer device in a software form, so that the one or more processors invoke and perform an operation corresponding to each of the foregoing modules.

Through the foregoing apparatus for recommending a cold start object, a content feature and an initial preference feature that are of a target object in a cold start state are obtained, multilayer perceptron processing is performed on the content feature based on a meta-mapping network obtained through training based on interaction data of a recommendation object in a simulated cold start state and a feature mapping relationship matching the target object is determined, and a mapping transformation is performed on the initial preference feature according to the feature mapping relationship and an updated preference feature close to a target preference feature spatial distribution is obtained. Because a spatial distribution of the updated preference feature is close to a spatial distribution of a preference feature corresponding to the recommendation object, it can be determined that an accurate preference feature can be learned for the target object in the cold start state, so that recommendation analysis is performed on the target object based on the updated preference feature to obtain a more accurate recommendation result.

In an embodiment, a computer device is provided. The computer device may be a server, and an internal structure diagram thereof may be shown in FIG. 9. The computer device includes one or more processors, a memory, an input/output (I/O) interface, and a communication interface. The processor, the memory, and the input/output interface are connected through a system bus, and the communication interface is connected to the system bus by the input/output interface. The processor of the computer device is configured to provide computing and control capabilities. The memory of the computer device includes a non-volatile storage medium and an internal memory. The non-volatile storage medium stores an operating system, computer-readable instructions, and a database. The internal memory provides an environment for running of the operating system and the computer-readable instructions in the non-volatile storage medium. The database of the computer device is configured to store interaction data. The input/output interface of the computer device is configured for information exchange between the processor and an external device. The communication interface of the computer device is configured to communicate with an external terminal through a network connection. A method for recommending a cold start object is implemented when the computer-readable instructions are executed by the one or more processors.

Figure 9:
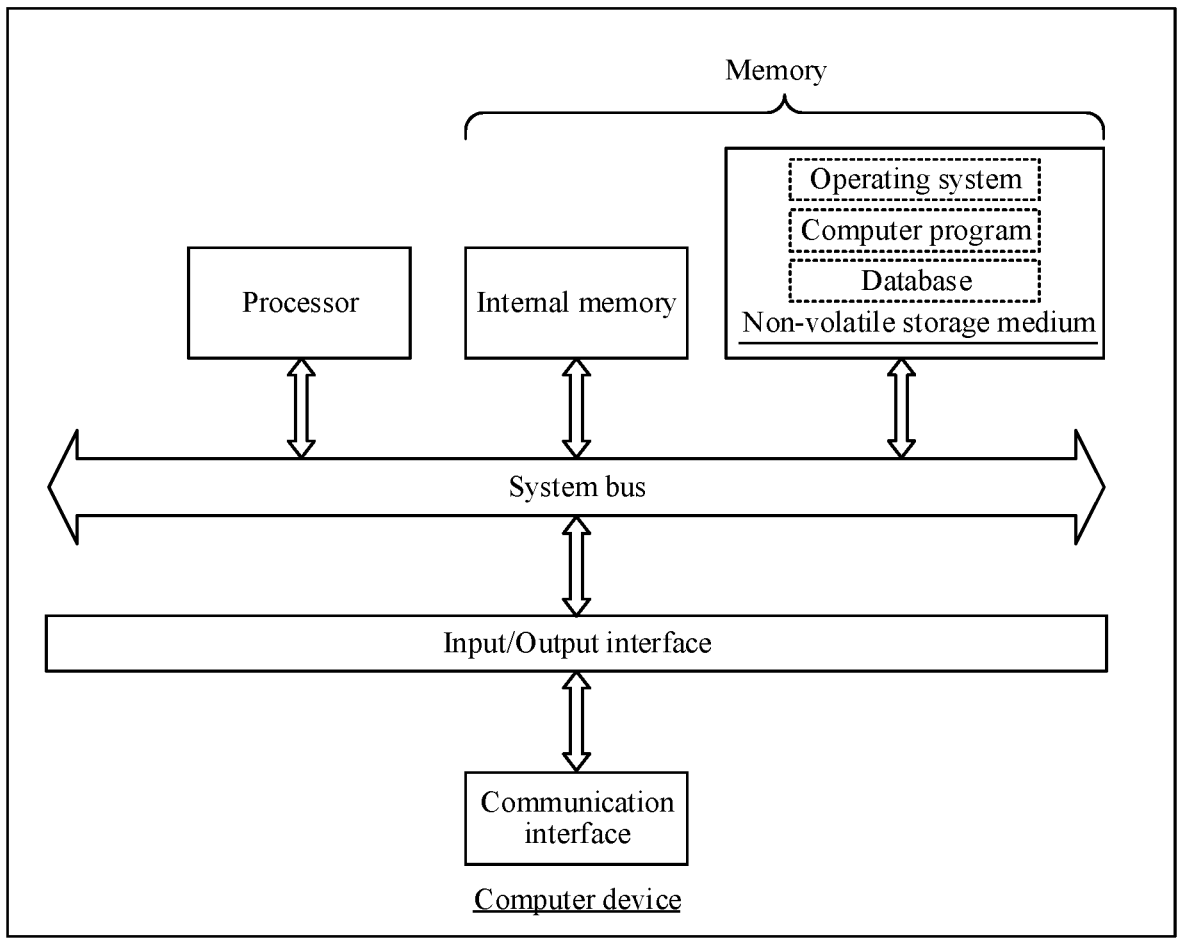
FIG. 9 is a diagram of an internal structure of a computer device according to an embodiment.

A person skilled in the art may understand that, the structure shown in FIG. 9 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, a computer device is provided, including a memory and one or more processors, the memory storing computer-readable instructions, and the steps in the foregoing method embodiments being implemented when the one or more processors execute the computer-readable instructions.

In an embodiment, a computer-readable storage medium is provided, storing computer-readable instructions, the steps in the foregoing method embodiments being implemented when the computer-readable instructions are executed by one or more processors.

In an embodiment, a computer program product is provided, storing computer-readable instructions, the steps in the foregoing method embodiments being implemented when the computer-readable instructions are executed by one or more processors.

User information (including, but not limited to, user device information, user personal information, and the like) and data (including, but not limited to, data used for analysis, stored data, displayed data, and the like) involved in this application are authorized by the user or fully authorized by all parties, and the collection, use and processing of relevant data need to comply with relevant laws, regulations and standards of relevant countries and regions.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to the memory, the database, or another medium used in the embodiments provided in this application may include at least one of a non-volatile memory and a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, or the like. The volatile memory may include a random access memory (RAM), an external cache, or the like. For the purpose of description instead of limitation, the RAM is available in a plurality of forms, such as a static random access memory (SRAM) or a dynamic random access memory (DRAM). The database involved in each embodiment provided in this application may include at least one of a relational database and a non-relational database. The non-relational database may include a blockchain-based distributed database, and the like, and is not limited thereto. The processor involved in each embodiment provided in this application may be a general-purpose processor, a central processing unit, a graphics processing unit, a digital signal processor, a programmable logic device, a quantum calculation-based data processing logic device, or the like, and is not limited thereto.

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

In this application, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module. The foregoing embodiments merely express several implementations of this application. The descriptions thereof are relatively specific and detailed, but should not be understood as limitations to the patent scope of this application. A person of ordinary skill in the art may make various changes and improvements without departing from the ideas of this application, which shall all fall within the protection scope of this application. Therefore, the protection scope of this application shall be subject to the appended claims.

What is claimed is:

1. A method for recommending a cold start object performed by a computer device, the method comprising:
   obtaining a content feature and an initial preference feature that are of a target object in a cold start state, wherein the target object comprises a target video;
   performing multilayer perceptron processing on the content feature based on a meta-mapping network to obtain a feature mapping relationship matching the target object;
   performing a mapping transformation on the initial preference feature according to the feature mapping relationship, to obtain an updated preference feature close to a target preference feature spatial distribution, further comprising:
     stretching a feature distribution of the initial preference feature according to a stretching function in the feature mapping relationship;
     fusing the content feature into a stretched space of the initial preference feature, to obtain an intermediate preference feature; and
     performing an offset adjustment on a feature distribution of the intermediate preference feature based on an offset function in the feature mapping relationship to remove noise data in the intermediate preference feature, to obtain the updated preference feature close to the target preference feature spatial distribution; and
   performing recommendation analysis on the target object based on the updated preference feature, to obtain a recommendation result for the target object.

2. The method according to claim 1, wherein the obtaining a content feature comprises:
   obtaining supplementary description information for the target video, and extracting a key video frame in the target video;
   performing image recognition on the key video frame, to obtain video content information in the key video frame; and
   performing vector conversion on the supplementary description information and the video content information, to obtain the content feature of the target object.

3. The method according to claim 1, wherein the obtaining an initial preference feature of a target object in a cold start state comprises:
   obtaining respective preference features of recommendation objects that satisfy the target preference feature spatial distribution; and performing global average pooling on the preference features, to obtain a global average preference feature as the initial preference feature of the target object in the cold start state.

4. The method according to claim 1, wherein the performing multilayer perceptron processing on the content feature based on a meta-mapping network, and determining a feature mapping relationship matching the target object comprises:

performing the multilayer perceptron processing on the content feature based on a meta-stretching network parameter in the meta-mapping network, to obtain the stretching function, wherein the stretching function is for causing the initial preference feature to be stretched close to the target preference feature spatial distribution.

5. The method according to claim 1, wherein a parameter training process of the meta-mapping network comprises:

obtaining a recommendation feedback tag in cold start simulation data of a recommendation object, and determining a recommendation result for the recommendation object;

determining loss data of the recommendation result and the recommendation feedback tag; and performing an iterative training on a parameter of the meta-mapping network based on the loss data through a gradient descent optimization algorithm until a training stop condition is satisfied, to obtain the meta-mapping network.

6. A computer device, comprising a memory and one or more processors, the memory storing computer-readable instructions that, when executed by the one or more processors, cause the computer device to perform a method for recommending a cold start object including:

obtaining a content feature and an initial preference feature that are of a target object in a cold start state, wherein the target object comprises a target video;

performing multilayer perceptron processing on the content feature based on a meta-mapping network to obtain a feature mapping relationship matching the target object;

performing a mapping transformation on the initial preference feature according to the feature mapping relationship, to obtain an updated preference feature close to a target preference feature spatial distribution, further comprising:

stretching a feature distribution of the initial preference feature according to a stretching function in the feature mapping relationship;

fusing the content feature into a stretched space of the initial preference feature, to obtain an intermediate preference feature; and performing an offset adjustment on a feature distribution of the intermediate preference feature based on an offset function in the feature mapping relationship to remove noise data in the intermediate preference feature, to obtain the updated preference feature close to the target preference feature spatial distribution; and performing recommendation analysis on the target object based on the updated preference feature, to obtain a recommendation result for the target object.

7. The computer device according to claim 6, wherein the obtaining a content feature comprises:

obtaining supplementary description information for the target video, and extracting a key video frame in the target video;

performing image recognition on the key video frame, to obtain video content information in the key video frame; and performing vector conversion on the supplementary description information and the video content information, to obtain the content feature of the target object.

8. The computer device according to claim 6, wherein the obtaining an initial preference feature of a target object in a cold start state comprises:

obtaining respective preference features of recommendation objects that satisfy the target preference feature spatial distribution; and performing global average pooling on the preference features, to obtain a global average preference feature as the initial preference feature of the target object in the cold start state.

9. The computer device according to claim 6, wherein the performing multilayer perceptron processing on the content feature based on a meta-mapping network, and determining a feature mapping relationship matching the target object comprises:

performing the multilayer perceptron processing on the content feature based on a meta-stretching network parameter in the meta-mapping network, to obtain the stretching function, wherein the stretching function is for causing the initial preference feature to be stretched close to the target preference feature spatial distribution.

10. The computer device according to claim 6, wherein a parameter training process of the meta-mapping network comprises:

obtaining a recommendation feedback tag in cold start simulation data of a recommendation object, and determining a recommendation result for the recommendation object;

determining loss data of the recommendation result and the recommendation feedback tag; and performing an iterative training on a parameter of the meta-mapping network based on the loss data through a gradient descent optimization algorithm until a training stop condition is satisfied, to obtain the meta-mapping network.

11. A non-transitory computer-readable storage medium, storing computer-readable instructions that, when executed by one or more processors of a computer device, cause the computer device to perform a method for recommending a cold start object including:

obtaining a content feature and an initial preference feature that are of a target object in a cold start state, wherein the target object comprises a target video;

performing multilayer perceptron processing on the content feature based on a meta-mapping network to obtain a feature mapping relationship matching the target object;

performing a mapping transformation on the initial preference feature according to the feature mapping relationship, to obtain an updated preference feature close to a target preference feature spatial distribution, further comprising:

stretching a feature distribution of the initial preference feature according to a stretching function in the feature mapping relationship;

fusing the content feature into a stretched space of the initial preference feature, to obtain an intermediate preference feature; and performing an offset adjustment on a feature distribution of the intermediate preference feature based on an offset function in the feature mapping relationship to remove noise data in the intermediate preference feature, to obtain the updated preference feature close to the target preference feature spatial distribution; and performing recommendation analysis on the target object based on the updated preference feature, to obtain a recommendation result for the target object.

12. The non-transitory computer-readable storage medium according to claim 11, wherein the obtaining a content feature comprises:

obtaining supplementary description information for the target video, and extracting a key video frame in the target video;

performing image recognition on the key video frame, to obtain video content information in the key video frame; and performing vector conversion on the supplementary description information and the video content information, to obtain the content feature of the target object.

13. The non-transitory computer-readable storage medium according to claim 11, wherein the obtaining an initial preference feature of a target object in a cold start state comprises:

obtaining respective preference features of recommendation objects that satisfy the target preference feature spatial distribution; and performing global average pooling on the preference features, to obtain a global average preference feature as the initial preference feature of the target object in the cold start state.

14. The non-transitory computer-readable storage medium according to claim 11, wherein the performing multilayer perceptron processing on the content feature based on a meta-mapping network, and determining a feature mapping relationship matching the target object comprises:

performing the multilayer perceptron processing on the content feature based on a meta-stretching network parameter in the meta-mapping network, to obtain the stretching function, wherein the stretching function is for causing the initial preference feature to be stretched close to the target preference feature spatial distribution.

* * * * *